United States Patent
Woo et al.

(10) Patent No.: US 8,926,443 B2
(45) Date of Patent: Jan. 6, 2015

(54) VIRTUAL GOLF SIMULATION DEVICE, SYSTEM INCLUDING THE SAME AND TERMINAL DEVICE, AND METHOD FOR VIRTUAL GOLF SIMULATION

(75) Inventors: Chang Heon Woo, Yongin-si (KR); Jae Yoon Ok, Goyang-si (KR)

(73) Assignee: Golfzon Co., Ltd., Daejeon (KR)

( * ) Notice: Subject to any disclaimer, the term of this patent is extended or adjusted under 35 U.S.C. 154(b) by 313 days.

(21) Appl. No.: 13/512,628

(22) PCT Filed: Nov. 30, 2010

(86) PCT No.: PCT/KR2010/008526
§ 371 (c)(1),
(2), (4) Date: May 30, 2012

(87) PCT Pub. No.: WO2011/065802
PCT Pub. Date: Jun. 3, 2011

(65) Prior Publication Data
US 2012/0289351 A1    Nov. 15, 2012

(30) Foreign Application Priority Data
Nov. 30, 2009  (KR) .................. 10-2009-0117336

(51) Int. Cl.
*A63B 69/36*           (2006.01)
(52) U.S. Cl.
CPC ............. *A63B 69/3623* (2013.01); *A63B 69/36* (2013.01)
USPC .............................................. 473/156; 463/7
(58) Field of Classification Search
CPC ..... A63B 69/36; A63B 69/3623; A63B 67/02

USPC ........................................ 463/7; 473/409, 156
See application file for complete search history.

(56) References Cited

U.S. PATENT DOCUMENTS

| | | | | |
|---|---|---|---|---|
| 5,221,082 | A * | 6/1993 | Curshod | 473/199 |
| 5,984,684 | A * | 11/1999 | Brostedt et al. | 434/252 |
| 6,396,041 | B1 * | 5/2002 | Vock et al. | 250/206.2 |
| 6,585,609 | B2 * | 7/2003 | Bays et al. | 473/407 |
| 2005/0227792 | A1 * | 10/2005 | McCreary et al. | 473/409 |
| 2006/0252018 | A1 * | 11/2006 | Sooch | 434/252 |
| 2009/0191929 | A1 * | 7/2009 | Nicora | 463/3 |

(Continued)

FOREIGN PATENT DOCUMENTS

| | | |
|---|---|---|
| KR | 10-2000-0063845 A | 11/2000 |
| KR | 10-2003-0044601 A | 6/2003 |
| KR | 10-2009-0032819 A | 4/2009 |
| KR | 10-2009-0070857 A | 7/2009 |

*Primary Examiner* — Corbett B Coburn
(74) *Attorney, Agent, or Firm* — Sherr & Jiang, PLLC (57) ABSTRACT

Disclosed herein are a virtual golf simulation device, a system including the same and a terminal device, and a virtual golf simulation method wherein the best shot or the worst shot occurring during a virtual golf game is stored in a server such that the best shot or the worst shot can be watched afterwards or such that the best shot or the worst shot can be shared by many persons, and a user enjoying a screen golf culture records various impressions of such a culture such that the impressions can be listened to afterward or can be open to the public, that is, various contents are provided, whereby a user using a screen golf system based on virtual golf simulation can enjoy various cultures which cannot be provided by a conventional golf system and thus interest of users can be induced.

20 Claims, 6 Drawing Sheets

(56) References Cited

U.S. PATENT DOCUMENTS

| | | | |
|---|---|---|---|
| 2010/0081116 A1* | 4/2010 | Barasch et al. | 434/252 |
| 2011/0230273 A1* | 9/2011 | Niegowski et al. | 473/199 |
| 2013/0113961 A1* | 5/2013 | Ishii et al. | 348/231.3 |

* cited by examiner

VIRTUAL GOLF SIMULATION DEVICE, SYSTEM INCLUDING THE SAME AND TERMINAL DEVICE, AND METHOD FOR VIRTUAL GOLF SIMULATION

CROSS REFERENCE TO PRIOR APPLICATIONS

This application is a National Stage Patent Application of PCT International Patent Application No. PCT/KR2010/008526 (filed on Nov. 30, 2010) under 35 U.S.C. §371, which claims priority to Korean Patent Application No. 10-2009-0117336 (filed on Nov. 30, 2009), which are all hereby incorporated by reference in their entirety.

TECHNICAL FIELD

The present invention relates to a virtual golf simulation device, a system including the same and a terminal device, and a virtual golf simulation method, and, more particularly, to a virtual golf simulation device and a virtual golf simulation method wherein a virtual golf course is imaged and simulated, and the trajectory of a golf ball hit by a user, i.e., a golfer, is simulated in the virtual golf course.

BACKGROUND ART

With the recent upsurge of the golfing population, a so-called screen golf system has gained popularity, which allows a golfer to practice golf and to enjoy a virtual golf game using a virtual golf simulation device.

The screen golf system senses the speed and direction of a golf ball that a golfer hits onto a screen installed indoors for displaying a virtual golf range, and displays the trajectory of a shot of the golf ball on the screen.

The screen golf system implemented using a virtual golf simulation device characteristically offers the same sense of reality that a golfer would feel in a real golf course, when the golfer hits a golf ball in the same manner as in a golf practice range.

It is necessary for the screen golf system implemented using a virtual golf simulation device to provide various contents based on various advanced devices and system, which cannot be provided by a real golf course or a golf practice range, thereby inducing interest of golfers in addition to provision of the same sense of reality that a golfer would feel playing a round of golf in a real golf course.

Also, screen golf based on virtual golf simulation, which is different from a round of golf in a real golf course, occupies an independent culture or an e-sport field. Therefore, it is necessary to provide various contents such that people wishing to enjoy such an independent culture can sufficiently enjoy their culture.

DISCLOSURE OF INVENTION

Technical Problem

Therefore, it is an object of the present invention to provide a virtual golf simulation device, a system including the same and a terminal device, and a virtual golf simulation method wherein the best shot or the worst shot occurring during a virtual golf game is stored in a server such that the best shot or the worst shot can be watched afterwards or such that the best shot or the worst shot can be shared by many persons, and a user enjoying a screen golf culture records various impressions of such a culture such that the impressions can be listened to afterward or can be open to the public, that is, various contents are provided, whereby a user using a screen golf system based on virtual golf simulation can enjoy various cultures which cannot be provided by a conventional golf system and thus interest of users can be induced.

Solution to Problem

In accordance with one aspect of the present invention, the above and other objects can be accomplished by the provision of a virtual golf simulation device including a sensing unit for sensing a golf ball hit by a golfer to analyze the hit golf ball, a capturing unit for capturing a swing motion of the golfer, an imaging means for displaying a simulated image based on a virtual golf course and the sensing result on a screen, a calculation means for determining whether the hit golf ball satisfies predetermined selection requirements as a result of simulation based on the sensing result, and a transmission means for extracting image data of the swing motion of the golfer captured by the capturing unit and transmitting the extracted image data to a server upon determining that the hit golf ball satisfies the predetermined selection requirements as the result of simulation.

In accordance with another aspect of the present invention, there is provided a virtual golf simulation system including a plurality of virtual golf simulation devices and a server to which the virtual golf simulation devices are connected via a network, wherein each of the virtual golf simulation devices includes a sensing unit for sensing a golf ball hit by a golfer to analyze the hit golf ball, a capturing unit for capturing a swing motion of the golfer, an imaging means for displaying a simulated image based on a virtual golf course and the sensing result on a screen, a calculation means for determining whether the hit golf ball satisfies predetermined selection requirements as a result of simulation based on the sensing result, and a transmission means for extracting image data of the swing motion of the golfer captured by the capturing unit and transmitting the extracted image data to a server upon determining that the hit golf ball satisfies the predetermined selection requirements as the result of simulation, and the server includes a database for storing the image data of the swing motion transmitted by the transmission means and a service unit for extracting and providing the image data of the swing motion from the database to a predetermined terminal device upon reception of request from the terminal device.

In accordance with a further aspect of the present invention, there is provided a virtual golf simulation method including logging into a system to play a virtual golf game, capturing a swing motion of a golfer, sensing movement of a golf ball hit by the golfer to analyze the hit golf ball, simulating a trajectory of the golf ball in a virtual golf course, determining whether predetermined selection requirements are satisfied as a result of the simulation, generating image data of the swing motion from the captured image of the swing motion of the golfer upon determining that the selection requirements are satisfied, and transmitting the generated image data of the swing motion to a server.

Advantageous Effects of Invention

In the virtual golf simulation device, the system including the same and the terminal device, and the virtual golf simulation method according to the present invention, the best shot or the worst shot occurring during a virtual golf game is stored in a server such that the best shot or the worst shot can be watched afterwards or such that the best shot or the worst shot can be shared by many persons, and a user enjoying a screen golf culture records various impressions of such a culture such that the impressions can be listened to afterward or can be open to the public, that is, various contents are provided. Consequently, the virtual golf simulation device, the system including the same and the terminal device, and the virtual golf simulation method according to the present invention allows users using a screen golf system based on virtual golf simulation to enjoy various cultures which cannot be provided by the conventional golf system, thereby inducing interest of the users.

BRIEF DESCRIPTION OF DRAWINGS

The above and other objects, features and other advantages of the present invention will be more clearly understood from the following detailed description taken in conjunction with the accompanying drawings, in which.

BEST MODE FOR CARRYING OUT THE INVENTION

Now, exemplary embodiments of a virtual golf simulation device, a system including the same and a terminal device, and a virtual golf simulation method according to the present invention will be described in detail with reference to the accompanying drawings.

The virtual golf simulation device according to the present invention may be embodied in various forms. Typically, the virtual golf simulation device according to the present invention may be applied to a so-called screen golf system.

Figure 1:
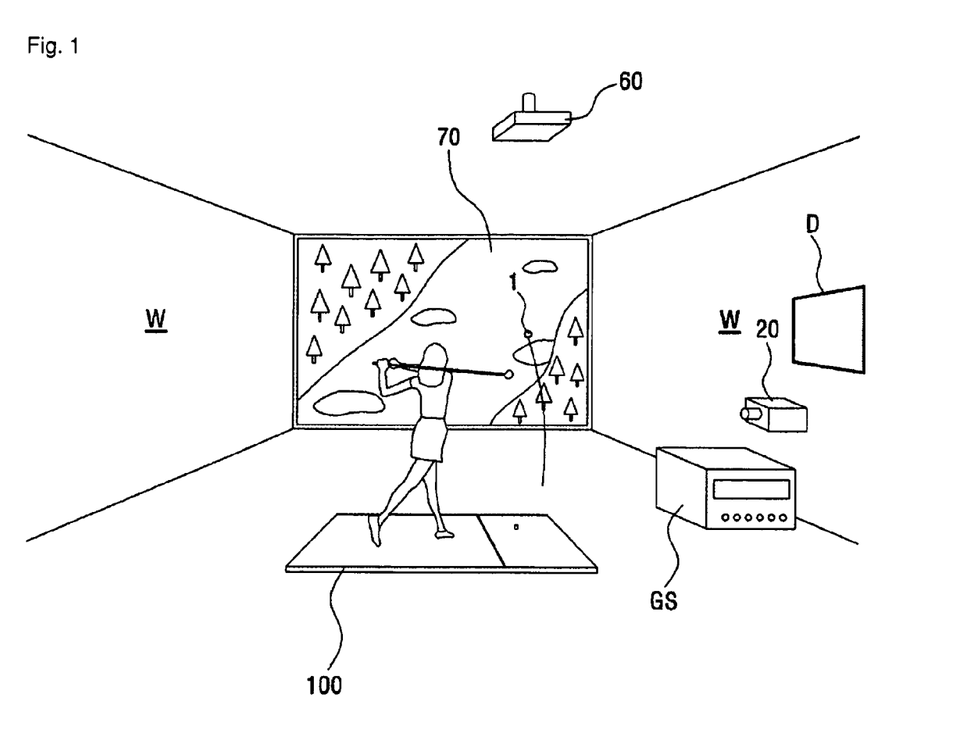
FIG. 1 is a view illustrating a screen golf system to which a virtual golf simulation device according to an embodiment of the present invention is applied.
Figure 3:
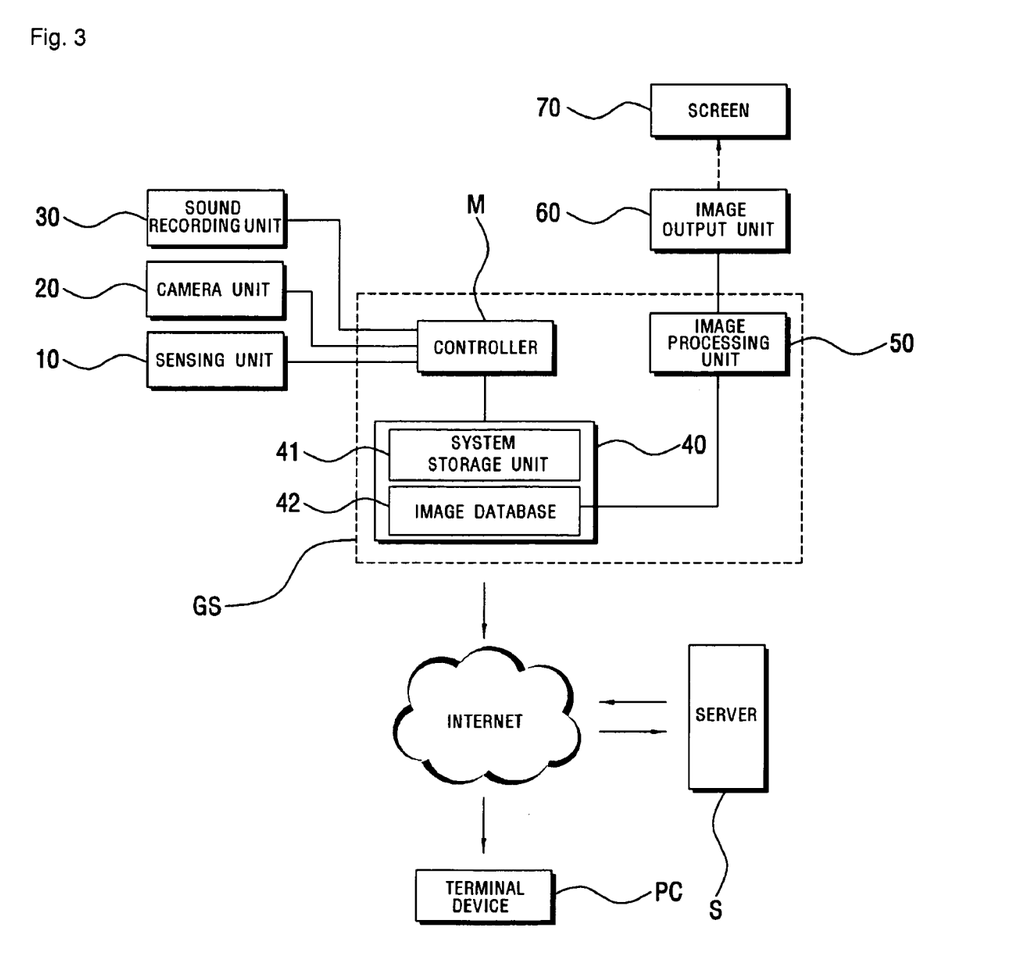
FIG. 3 is a view illustrating the detailed construction of a golf simulator of the virtual golf simulation system shown in FIG. 2.

FIGS. 1 and 3 illustrate an example in which a virtual golf simulation device according to the present invention is applied to a screen golf system, to which, however, the present invention is not limited. For example, the present invention may be applied to a variety of systems and/or devices that are capable of simulating and imaging a virtual golf course and simulating a virtual golf ball image.

Hereinafter, an example in which a virtual golf simulation device and method according to the present invention are applied to a screen golf system will be described with reference to FIGS. 1 to 3.

As shown in FIG. 1, a virtual golf simulation device according to an embodiment of the present invention includes a swing plate 100, an image output unit 60, having a sensing unit (not shown), for outputting a predetermined image to a screen 70 disposed in front of the image output unit 60, and a golf simulator GS for storing and processing all data necessary for virtual golf simulation. In FIG. 1, W indicates side walls of a booth for screen golf.

Figure 2:
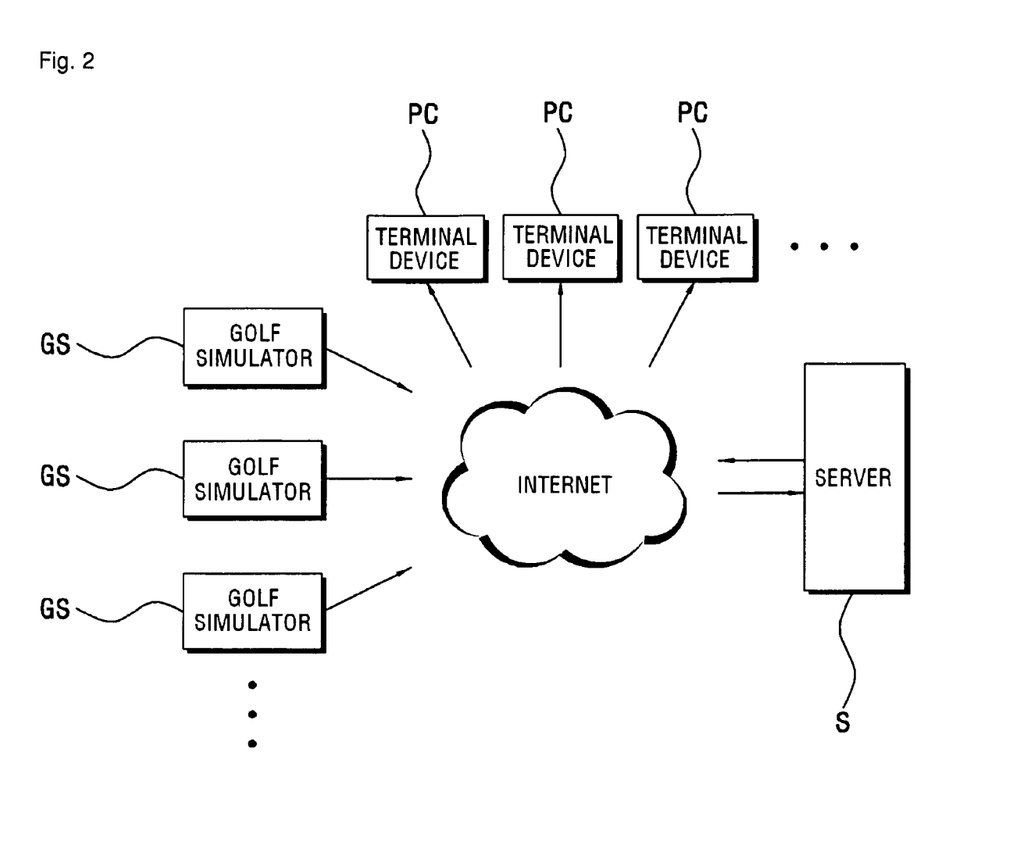
FIG. 2 is a schematic view illustrating a virtual golf simulation system according to an embodiment of the present invention.

FIG. 2 illustrates an example of a virtual golf simulation system according to the present invention. As shown in FIG. 2, the virtual golf simulation system includes a plurality of golf simulators GS and a server S, which are connected to each other via a network, such as the Internet.

Various personal terminal devices PC may be connected to the server S via the Internet such that the respective terminal devices PC receives predetermined information from the server S.

FIG. 3 is a block diagram more concretely illustrating a virtual golf simulation device according to an embodiment of the present invention. A virtual golf simulation device according to an embodiment of the present invention may include a golf simulator GS, a sensing unit 10, a camera unit 20, a sound recording unit 30, and an image output unit 60.

The image output unit 60 may be provided in the form of a beam projector that outputs an image to a screen 70 as shown in FIG. 1. Alternatively, the image output unit 60 may be provided as a device having a large-sized screen to directly display an image.

The golf simulator GS may include a controller M, a storage unit 40, and an image processing unit 50. The storage unit 40 may include a system storage unit 41 for storing various information data related to the virtual golf simulation device and an image database 42 for embodying a golf course image.

The system storage unit 41 and the image database 42 may be separately mounted in different storage devices. Alternatively, the system storage unit 41 and the image database 42 may be separately mounted in physically separate regions of the same storage device.

The golf simulator GS is provided with a data transmission means, which transmits data to the server S via a network, such as the Internet (including both wireless and wired schemes).

The image processing unit 50 is an imaging means that displays a simulated image obtained from a virtual golf course and sensing results of the sensing unit 10. The image processing unit 50 processes all images related to virtual golf simulation, such as images related to a virtual golf course, images related to movement of a golf ball, and images for menu selection, stored in the image database 42.

The controller M is a calculation means that determines whether a shot of the golf ball satisfies predetermined requirements as a result of simulation based on the sensing results of the sensing unit 10. The controller M performs various calculations for virtual golf simulation and controls components of the virtual golf simulation device.

That is, referring to FIGS. 1 and 3, when a golfer hits a golf ball 1 on the swing plate 100 to the screen 70, the sensing unit 10 senses the shot of the golf ball 1, and transmits the sensing result to the controller M. The controller M transmits the sensing result to the image processing unit 50. The image processing unit 50 extracts golf simulation image information, such as a movement image of the golf ball, from the image database 42 in consideration of movement properties of the golf ball 1. The golf simulation image information is projected on the screen 70 through the image output unit 60 such that a golf game through virtual simulation is performed.

Although not clearly shown in FIG. 1, the sensing unit 10 (see FIG. 3) senses the golf ball hit by the golfer to analyze the shot of the golf ball 1. The sensing unit 10 may be embodied by an infrared sensor mounted at the swing plate 100 or a camera sensor mounted at the ceiling or the wall. In addition, the sensing unit may be embodied by other different sensors.

In the virtual golf simulation device according to this embodiment, the camera unit 20 captures a swing motion of the golfer. Although not shown, the virtual golf simulation device may further include a sound recording unit 30.

When a golfer hits a golf ball 1 to play a virtual golf game, the trajectory of a virtual golf ball is simulated as an image. At this time, the camera unit 20 captures a swing motion of the golfer, and the golf simulator GS determines whether a shot of the golf ball is selected as the best shot based on predetermined requirements when the distance to where the hit golf ball is flew, i.e., the flight distance of the hit golf ball, is greater than a predetermined distance and determines whether a shot of the golf ball is selected as the worst shot based on the predetermined requirements when the flight distance of the hit golf ball is less than the predetermined distance or the golf ball is caught in a trap.

When the shot of the golf ball is selected as the best shot or the worst shot, the golf simulator GS extracts the swing motion when the shot of the golf ball is selected as the best shot or the swing motion when the shot of the golf ball is selected as the worst shot from image data captured by the camera unit 20.

Image data related to the extracted swing motion are displayed on the screen to provide information on the best shot or the worst shot, and the image data related to the swing motion is transmitted to the server S through a predetermined transmission means.

The server S stores the received image data related to the swing motion in the database so as to provide the image data related to the swing motion to a user when the user requests the image data related to the swing motion through a terminal device.

Therefore, the user may properly determine whether his/her golf shot is good or wrong and may correct his/her swing motion, thereby improving his/her golf skill.

Also, In the virtual golf simulation device according to another embodiment, the virtual golf simulation device further includes an impression recording generation means which records impressions of the golfer using the capturing unit and the sound recording unit to generate image data of the impression recording.

Therefore, upon the completion of the virtual golf game, the user may record his/her impressions on the virtual golf, his/her evaluation on the screen golf system through which he/she has played the round of golf, and his/her other impressions using the camera unit 20 and the sound recording unit 30.

The recorded data may be transmitted to the server, in which the recorded data are stored. Afterwards, the stored data may be confirmed through a terminal device according to the request of a user or may be open to other users such that the users can see the stored data. That is, it is possible to provide an opportunity in which specific information can be indirectly provided to other users and an opportunity in which opinions between users can be exchanged.

A series of processes as described above will be described in more detail with reference to FIGS. 4 to 6.

Figure 4:
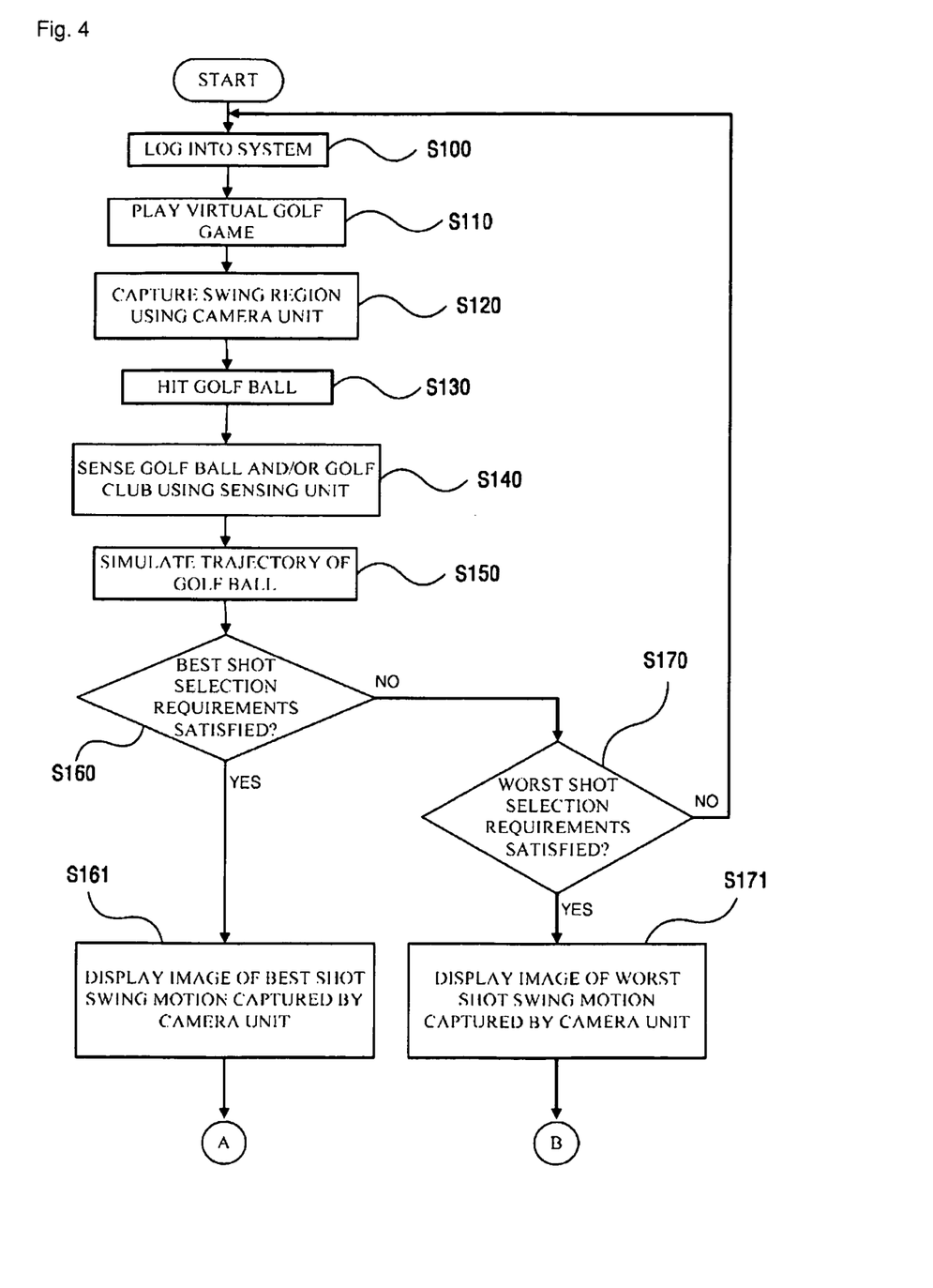
FIGS. 4 and 5 are flow charts illustrating a virtual golf simulation method according to an embodiment of the present invention.
Figure 5:
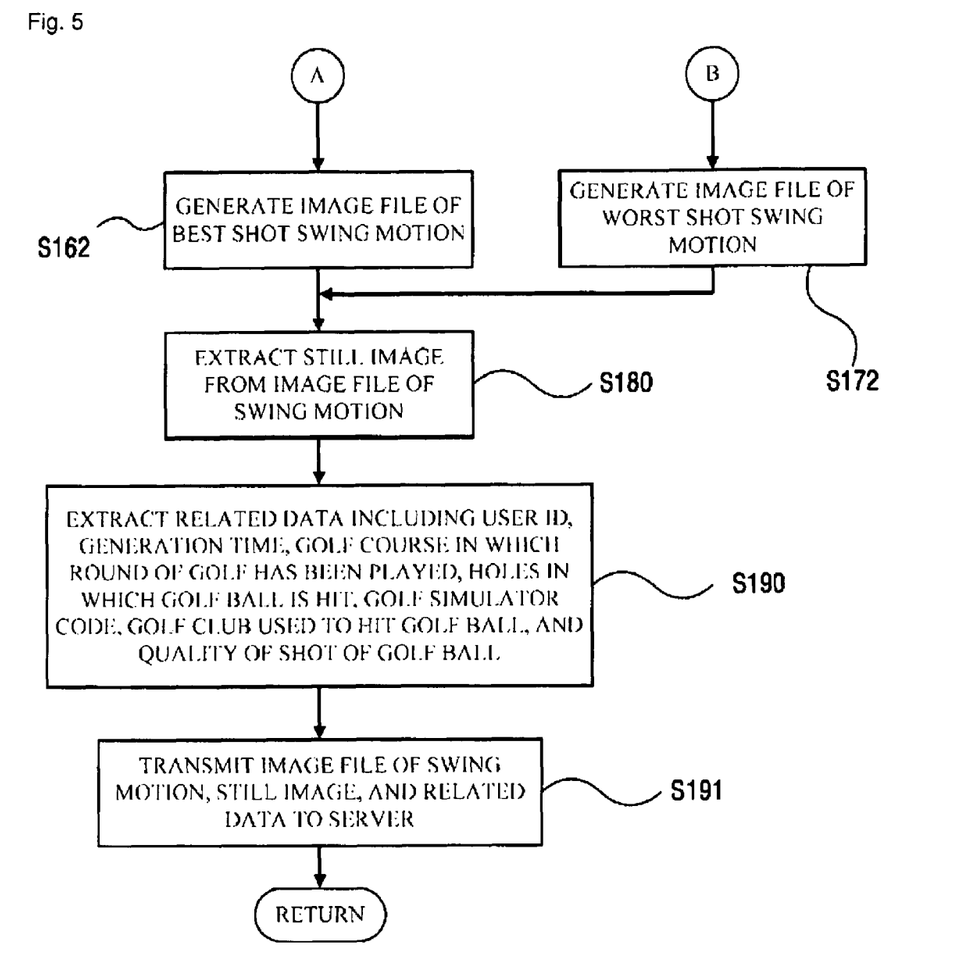
Figure 6:
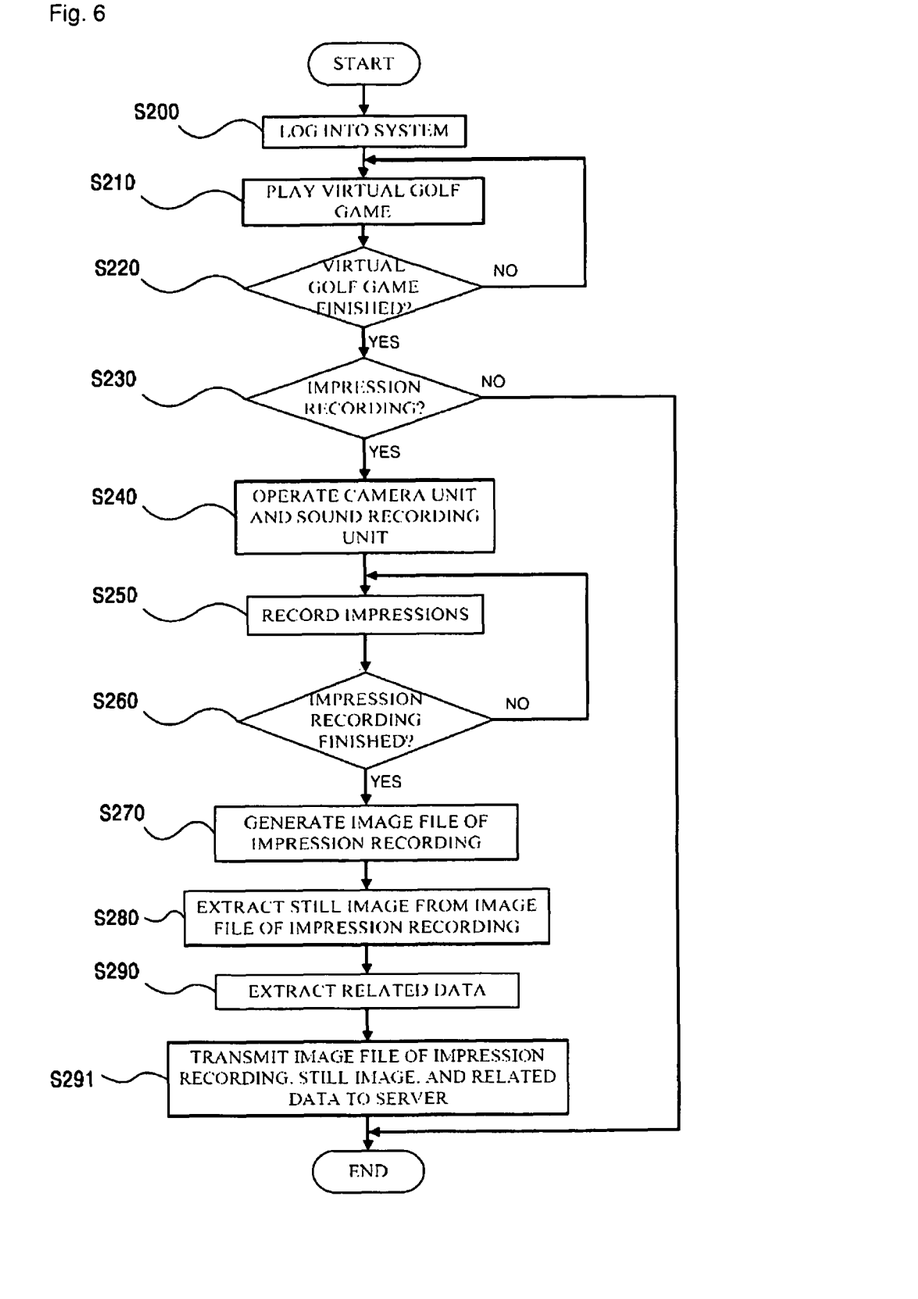
FIG. 6 is a flow chart illustrating a virtual golf simulation method according to another embodiment of the present invention.

As shown in FIGS. 4 to 6, a golfer logs into a system to play a round of golf on a predetermined system (for example, a screen golf system) based on a virtual golf simulation device (S100).

After logging into the system, the golfer inputs a desired golf course and various options to play a virtual golf game (S110).

While the virtual golf game is being played, the camera unit captures a swing motion of the golfer. The camera unit is fixedly mounted to capture a swing area. The camera unit captures processes in which the golfer hits a golf ball in the swing area, i.e., in the swing plate.

When the golfer hits a golf ball (S130), a shot of the golf ball is sensed by the sensing unit (S140) and is calculated by the controller of the golf simulator. As a result, the simulated trajectory of the shot of the golf ball is displayed as an image (S150).

At this time, the golfer determines whether the shot of the golf ball is the best shot or the worst shot based on the trajectory of the shot of the golf ball (S160 and S170).

Here, the best shot may be decided based on determination as to whether other requirements are satisfied while the flight distance of the hit golf ball is greater than a predetermined distance.

For example, the best shot may be decided based on the kind of a golf club used to hit the golf ball, determination as to whether the virtual golf ball is located in a fairway, and how many times the golf ball is hit. In addition, information on the skill rank of the golfer logging into the system is loaded from the system storage unit, and the best shot may be decided based thereon. Alternatively, the best shot may be decided based on determination as to whether a mode of the virtual golf game in which the golfer plays a round of golf is a professional mode, an amateur mode, or a beginner mode.

Also, if the best shot or the worst shot appears too frequently, the golfer may feel displeasure. For this reason, the appearance frequency of the best shot or the worst shot may be restricted.

For example, when a tee shot is performed using a first wood driver, the flight distance of a golf ball is 200 m or more, the golf ball is located in a fairway, and the best shot has not appeared with respect to the driver shot, this shot may be selected as the best shot.

In consideration of the skill rank of the golfer logging into the system or the golf game mode, the flight distance of a golf ball hit by a golfer having a high skill rank, based on which the best shot is selected, may be increased, and the flight distance of a golf ball hit by a golfer having a low skill rank, based on which the best shot is selected, is decreased. In case of the professional mode, selection requirements for the best shot may be more strictly set than in the case of the amateur mode or the beginner mode.

On the other hand, the worst shot may be set such that the worst shot appears more frequently when the skill rank is high than when the skill rank is low. Alternatively, it is possible to set the worst shot such that the worst shot appears more frequently in case of the professional mode than in case of the amateur mode or the beginner mode.

When the shot of the golf ball is selected as the best shot or the worst shot based on the selection requirements for the best shot or the worst shot, an image of the swing motion corresponding to the shot of the golf ball captured by the camera unit is preferably displayed on the screen for a predetermined period of time such that the golfer can confirm his/her swing motion (S161 and S171).

The controller of the golf simulator extracts and generates image data (image file) of the best shot swing motion or the worst shot swing motion from the image data captured by the camera unit (S162 and S172).

Subsequently, the controller extracts a still image from the image data (image file) of the swing motion (S180).

The still image is extracted to show image data of a corresponding swing motion through a list when the still image is provided from the server to a user terminal device.

Meanwhile, the controller extracts related data from the system storage unit and generates the extracted data as a file (S190). Here, the related data include at least one selected from a group consisting of information on a user, information on a golf course and simulation environment which are simulated, information on a device used by the user, information on a golf club used by the user, and information on simulation results.

More specifically, the related data may include a user identification (ID) of the golfer logging into the system, image data generation time, a golf course in which the golfer has played a round of golf, holes in which the golf ball is hit, a golf simulator code, information on a golf club used to hit the golf ball, and information on quality of the shot of the golf ball.

The swing motion image file (the best shot or the worst shot), the extracted still image, and the above related data are all transmitted to the server (S191).

The server stores the received data in the database and, upon reception of a request from a user terminal device, provides an image related to the swing motion stored in the database to the user terminal device through a service unit.

Therefore, if a user selects a still image on the list related to the swing motion displayed through the user device connected to the server, the user can be provided on a swing motion image linked to the selected still image.

In another embodiment of the present invention as shown in FIG. 6, a golfer logs into a system (S200), the golfer plays a virtual golf game (S210), the virtual golf game 9 is finished (S220), and the golfer determines whether his/her impressions will be recorded (S230).

That is, upon finish of the virtual golf game, the user may record his/her impressions on the virtual golf game, his/her impressions on the virtual golf simulation device, and his/her evaluation on a so-called screen golf house including such a virtual golf simulation device using the camera unit and the sound recording unit (S240 and S250).

When the user's impression recording is completed (S260), the controller of the golf simulator generates image data (image file (including speech)) of the impression recording from the image and speech data recorded by the camera unit and the sound recording unit.

The impression recording generation means, that is, controller extracts a still image from the image data of the impression recording (S290). Subsequently, the controller extracts related data including a user identification (ID) of the golfer logging into the system, image data generation time, a golf course in which the golfer has played a round of golf, holes in which the golf ball is hit, a golf simulator code, information on a golf club used to hit the golf ball, and information on quality of the shot of the golf ball from the system storage unit, and generates the extracted related data as a file (S290). The still image is extracted to show image data of a corresponding impression recording through a list when the still image is provided from the server to a user terminal device.

When the user selects the transmission of the impression recording data or the impression recording data is automatically transmitted, the image data of the impression recording, the still image, and the related data are transmitted to the server (S291).

The server stores the received data in the database and, when receiving request from a user terminal device, provides the data to the user terminal device.

Therefore, if a user selects a still image on the list related to the impression recording displayed through the user device connected to the server, the user can be provided on an impression recording contents linked to the selected still image.

MODE FOR THE INVENTION

Various embodiments of a VIRTUAL GOLF SIMULATION DEVICE, SYSTEM INCLUDING THE SAME AND TERMINAL DEVICE, AND METHOD FOR VIRTUAL GOLF SIMULATION have been described in the best mode for carrying out the invention.

INDUSTRIAL APPLICABILITY

The virtual golf simulation device, the system including the same and the terminal device, and the virtual golf simulation method according to the present invention allows users using a screen golf system based on virtual golf simulation to enjoy various cultures which cannot be provided by the conventional golf system. Consequently, the present invention has industrial applicability.

The invention claimed is:

1. A virtual golf simulation device comprising:
    a sensing unit for sensing a golf ball hit by a golfer to analyze the hit golf ball;
    a capturing unit for capturing a swing motion of the golfer;
    an imaging means for displaying a simulated image based on a virtual golf course and the sensing result on a screen;
    a calculation means for determining whether the hit golf ball satisfies predetermined selection requirements as a result of simulation based on the sensing result, wherein the predetermined selection requirements are that the hit golf ball is a best shot or a worst shot; and
    a transmission means for extracting image data of the swing motion of the golfer captured by the capturing unit and transmitting the extracted image data to a server upon determining that the hit golf ball satisfies the predetermined selection requirements as the result of simulation.

2. The virtual golf simulation device according to claim 1, wherein the imaging means is configured to display the captured swing motion image on the screen for a predetermined period of time when the calculation means determines that the hit golf ball satisfies predetermined selection requirements.

3. The virtual golf simulation device according to claim 1, further comprising:
    a sound recording unit for recording impressions of the golfer; and
    an impression recording generation means for recording impressions of the golfer using the capturing unit and the sound recording unit to generate image data of the impression recording, wherein
    the transmission means is configured to transmit the image data of the impression recording to the server.

4. The virtual golf simulation device according to claim 1, further comprising:
    a still image extraction means for extracting a still image from the image data of the swing motion, wherein
    the transmission means is configured to transmit the extracted still image and the image data of the swing motion to the server.

5. The virtual golf simulation device according to claim 1, further comprising:
    a related data extraction means for extracting related data comprising at least one selected from a group consisting of information on a user, information on a golf course and simulation environment which are simulated, information on a device used by the user, information on a golf club used by the user, and information on simulation results, wherein
    the transmission means is configured to transmit the extracted related data and the image data of the swing motion to the server.

6. The virtual golf simulation device according to claim 3, further comprising:
a still image extraction means for extracting a still image from the image data of the impression recording, wherein
the transmission means is configured to transmit the extracted still image and the image data of the impression recording to the server.

7. The virtual golf simulation device according to claim 3, further comprising:
a related data extraction means for extracting related data comprising at least one selected from a group consisting of information on a user, information on a golf course and simulation environment which are simulated, information on a device used by the user, information on a golf club used by the user, and information on simulation results, wherein
the transmission means is configured to transmit the extracted related data and the image data of the impression recording to the server.

8. The virtual golf simulation device according to claim 1, wherein the calculation means is configured to determine the selection requirements according to at least one selected from a group consisting of a flight distance of the hit golf ball as a result of the simulation, a skill rank of a login golfer, a game mode, a limit in number of selections, determination as to whether the golf ball is located in a fairway, determination as to whether the golf ball is located in a green, a game record at a corresponding hole, and a weather condition.

9. A virtual golf simulation system comprising a plurality of virtual golf simulation devices and a server to which the virtual golf simulation devices are connected via a network, wherein each of the virtual golf simulation devices comprises:
a sensing unit for sensing a golf ball hit by a golfer to analyze the hit golf ball;
a capturing unit for capturing a swing motion of the golfer;
an imaging means for displaying a simulated image based on a virtual golf course and the sensing result on a screen;
a calculation means for determining whether the hit golf ball satisfies predetermined selection requirements as a result of simulation based on the sensing result, wherein the predetermined selection requirements are that the hit golf ball is a best shot or a worst shot;
and a transmission means for extracting image data of the swing motion of the golfer captured by the capturing unit and transmitting the extracted image data to a server upon determining that the hit golf ball satisfies the predetermined selection requirements as the result of simulation, and
the server comprises: a database for storing the image data of the swing motion transmitted by the transmission means;
and a service unit for extracting and providing the image data of the swing motion from the database to a terminal device upon reception of request from the terminal device.

10. The virtual golf simulation system according to claim 9, wherein each of the virtual golf simulation devices further comprises: a sound recording unit for recording impressions of the golfer; and an impression recording generation unit for recording impressions of the golfer using the capturing unit and the sound recording unit to generate image data of the impression recording, the transmission means being configured to transmit the image data of the impression recording to the server, and the server stores image data of the impression recording in the database, and extracts and provides the image data of the swing motion from the database to a terminal device through the service unit upon reception of request from the terminal device.

11. The virtual golf simulation system according to claim 9, wherein each of the virtual golf simulation devices further comprises: a still image extraction means for extracting a still image from the image data of the swing motion; and a related data extraction means for extracting related data comprising at least one selected from a group consisting of information on a user, information on a golf course which is simulated and use environment, information on a device used by the user, information on a golf club used by the user, and information on simulation results, the transmission means being configured to transmit the extracted still image, the extracted related data, the image data of the swing motion to the server.

12. The virtual golf simulation system according to claim 11, wherein the server is configured to sort and store data based on the transmitted related data and to show a user the still image which links the swing motion image through a user terminal device.

13. The virtual golf simulation system according to claim 10, wherein each of the virtual golf simulation devices further comprises: a still image extraction means for extracting a still image from the image data of the impression recording; and a related data extraction means for extracting related data comprising at least one selected from a group consisting of information on a user, information on a golf course which is simulated and use environment, information on a device used by the user, information on a golf club used by the user, and information on simulation results, the transmission means being configured to transmit the extracted still image, the extracted related data, and the image data of the impression recording to the server, and
the server is configured to sort and store data based on the transmitted related data and to display the still image for service provision.

14. A virtual golf simulation method comprising:
logging into a system to play a virtual golf game;
capturing a swing motion of a golfer;
sensing movement of a golf ball hit by the golfer to analyze the hit golf ball;
simulating a trajectory of the golf ball in a virtual golf course;
determining whether predetermined selection requirements are satisfied as a result of the simulation, wherein the predetermined selection requirements are that the hit golf ball is a best shot or a worst shot;
generating image data of the swing motion from the captured image of the swing motion of the golfer upon determining that the selection requirements are satisfied; and
transmitting the generated image data of the swing motion to a server.

15. The virtual golf simulation method according to claim 14, wherein the step of determining whether the selection requirements are satisfied comprises determining a best shot selection requirement when a flight distance of the hit golf ball is greater than a predetermined distance as a result of the simulation.

16. The virtual golf simulation method according to claim 14, wherein the step of determining whether the selection requirements are satisfied comprises determining a worst shot selection requirement when a flight distance of the hit golf ball is less than a predetermined distance or the golf ball is caught in a trap as a result of the simulation.

17. The virtual golf simulation method according to claim 14, wherein the selection requirements are determined according to at least one selected from a group consisting of a flight distance of the hit golf ball, a skill rank of the login golfer, a game mode, a limit in number of selections, determination as to whether the golf ball is located in a fairway, determination as to whether the golf ball is located in a green, a game record at a corresponding hole, and a weather condition.

18. The virtual golf simulation method according to claim 14, further comprising:
   determining whether impressions of the golfer will be recorded upon finish of the virtual golf game;
   recording impressions of the golfer using a capturing unit and a sound recording unit upon determining that the impressions of the golfer will be recorded;
   generating image data of the impression recording; and
   transmitting the generated image data of the impression recording to the server.

19. The virtual golf simulation method according to claim 14, further comprising:
   extracting a still image from the generated image data of the swing motion;
   extracting related data comprising at least one selected from a group consisting of a user identification (ID), image data generation time, a golf course in which the golfer has played a round of golf, holes in which the golf ball is hit, a device code, information on quality of the shot of the golf ball, information on a golf club used to hit the golf ball, a game mode, a skill rank, and a game record; and
   transmitting the extracted still image and the extracted related data to the server.

20. The virtual golf simulation method according to claim 18, further comprising:
   extracting a still image from the generated image data of the impression recording;
   extracting related data comprising at least one selected from a group consisting of a user identification (ID), image data generation time, a golf course in which the golfer has played a round of golf, holes in which the golf ball is hit, a device code, information on quality of the shot of the golf ball, information on a golf club used to hit the golf ball, a game mode, a skill rank, and a game record; and
   transmitting the extracted still image and the extracted related data to the server.

* * * * *